United States Patent
Bachman et al.

(10) Patent No.: US 10,809,165 B2
(45) Date of Patent: Oct. 20, 2020

(54) PRESSURE REDUCTION SYSTEM AND METHOD FOR REDUCING THE PRESSURE OF HIGH PRESSURE AEROSOLS

(71) Applicant: General Electric Company, Schenectady, NY (US)

(72) Inventors: Frank Gerald Bachman, Maineville, OH (US); William Martin Silvis, Ann Arbor, MI (US); Tristan Kurt Peter Reinisch, Graz (AT); Alexander Bergmann, Graz (AT)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 16/022,793

(22) Filed: Jun. 29, 2018

(65) Prior Publication Data
US 2020/0003662 A1    Jan. 2, 2020

(51) Int. Cl.
*G01N 1/22* (2006.01)
(52) U.S. Cl.
CPC ......... *G01N 1/2247* (2013.01); *G01N 1/2252* (2013.01); *G01N 2001/2223* (2013.01)
(58) Field of Classification Search
CPC .............. G01N 1/2247; G01N 1/2252; G01N 2001/2255; G01N 2001/2223
See application file for complete search history.

(56) References Cited

U.S. PATENT DOCUMENTS

| | | | |
|---|---|---|---|
| 1,990,837 A * | 2/1935 | Morgenstern | F01N 1/089 181/255 |
| 2,363,625 A | 11/1944 | Swearingen | |
| 3,129,590 A | 4/1964 | Ellis | |
| 3,841,145 A | 10/1974 | Boubel | |
| 5,027,642 A | 7/1991 | Wen et al. | |
| 7,089,747 B2 | 8/2006 | Fox et al. | |
| 8,141,440 B2 | 3/2012 | Gammon et al. | |
| 8,505,395 B2 * | 8/2013 | Graze, Jr. | G01N 1/2202 73/863.51 |
| 8,726,747 B2 | 5/2014 | Kennett et al. | |

(Continued)

FOREIGN PATENT DOCUMENTS

GB    1059755 A    2/1967

OTHER PUBLICATIONS

Durdina et al., Determination of PM mass emissions from an aircraft turbine engine using particle effective density. Atmospheric Environment, vol. 99, Dec. 2014, pp. 500-507. (Abstract Only) https://doi.org/10.1016/j.atmosenv.2014.10.018.

(Continued)

*Primary Examiner* — Justin N Olamit
(74) *Attorney, Agent, or Firm* — Hanley, Flight & Zimmerman, LLC (57) ABSTRACT

A pressure reduction system and methods therefore that include features for reducing the pressure of a high pressure aerosol to ambient pressure without significantly changing the characteristics of the aerosol are provided. In this manner, the non-volatile particulate matter concentration in a sample stream obtained from the aerosol stream at ambient pressure is representative of the non-volatile particulate matter concentration that was present in the aerosol stream at high pressure prior to the pressure reduction.

5 Claims, 6 Drawing Sheets

(56) References Cited

U.S. PATENT DOCUMENTS 8,852,535 B2  10/2014  Al-Taie et al.
2017/0167954 A1  6/2017  Thompson et al.

OTHER PUBLICATIONS

Echavarria et al., Burnout of soot particles in a two-stage burner with a JP-8 surrogate fuel, Combustion and Flame, vol. 159(7), Jul. 2012, pp. 2441-2448. (Abstract Only) DOI: 10.1016/j.combustflame.2012.03.011.

Kohler, et al., Sooting turbulent jet flame: characterization and quantitative soot measurements. Applied Physics B, vol. 104, Issue 2, Aug. 2011, pp. 409-425. (Abstract Only) DOI 10.1007/s00340-011-4373-y.

Popovicheva et al., Microstructure and Water Adsorbability of Aircraft Combustor Soots and Kerosene Flame Soots: Toward an Aircraft-Generated Soot Laboratory Surrogate, The Journal of Physical Chemistry, vol. 107, Issue 47, pp. 10046-10054, Oct. 31, 2003. (Abstract Only) DOI: 10.1021/jp034402f.

Popovicheva et al., Experimental characterization of aircraft combustor soot: Microstructure, surface area, porosity and water adsorption, Physical Chemistry Chemical Physics, vol. 19, Issue 2, Sep. 2000, pp. 4421-4426. DOI: 10.1039/B004345L.

Wey et al., Modeling Jet Engine Aerosols in the Postcombustor Flow Path and Sampling System, Journal of Propulsion and Power, vol. 23, No. 5, Sep.-Oct. 2007, pp. 930-941. doi:10.2514/1.24274.

Lee et al., Design and Performance Evaluation of a Pressure-Reducing Device for Aerosol Sampling from High-Purity Gases, Aerosol Science and Technology, 19:3 1993, pp. 215-226. http://dx.doi.org/10.1080/02786829308959631.

Wey et al., Assessment of Microphysical Models in the National Combustion Code (NCC) for Aircraft Particulate Emissions: Particle Loss in Sampling Lines, $47^{th}$ AIAA Aerospace Sciences Meeting Including the New Horizons Forum and Aerospace Exposition, AIAA 2009-257, Jan. 5-8, 2009, Orlando, Florida, pp. 1-16.

Liscinsky et al., Effect of Particle Sampling Technique & Transport on Particle Penetration at the High Temperature & Pressure Conditions found in Gas Turbine Combustors & Engines, NASA Contract. NASA/CR-2010-NNCO7CB03C, Mar. 2010, pp. 1-97.

Liscinsky et al., Characterization of Aviation Soot Emissions With a High-Pressure Gas Turbine Combustor Rig, ASME Turbo Expo 2014: Turbine Technical Conference and Exposition, vol. 4A Combustion, Fuels and Emissions, Dusseldorf, Germany, GT2014-25226, Jun. 16-20, 2014, 10 Pages. (Abstract Only) doi:10.1115/GT2014-25226.

Ess et al., In situ Raman microspectroscopic analysis of soot samples with different organic.carbon content: Structural changes during heating, Science Direct, vol. 105, Aug. 2016, pp. 572-585. (Abstract Only) https://doi.org/10/1016/j.carbon.2016.04.056.

* cited by examiner

302
EXPAND THE AEROSOL STREAM THROUGH A FIRST CRITICAL ORIFICE INTO A FIRST CHAMBER DEFINED BY AN ENCLOSURE TO REDUCE THE AEROSOL STREAM FROM THE HIGH PRESSURE TO AN INTERMEDIATE PRESSURE

304
EXPAND THE AEROSOL STREAM THROUGH A SECOND CRITICAL ORIFICE DEFINED BY A TRANSITION TUBE INTO A SECOND CHAMBER DEFINED BY THE ENCLOSURE TO REDUCE THE AEROSOL STREAM FROM THE INTERMEDIATE PRESSURE TO THE LOW PRESSURE, WHEREIN THE TRANSITION TUBE IS COMPLETELY ENCLOSED BY THE ENCLOSURE

FIG. 8

PRESSURE REDUCTION SYSTEM AND METHOD FOR REDUCING THE PRESSURE OF HIGH PRESSURE AEROSOLS

FIELD

The present subject matter relates generally to a pressure reduction system and methods therefore for reducing the pressure of aerosol streams from high pressure environments such that a representative non-volatile particulate concentration of the stream may be sampled.

BACKGROUND

Exhaust from gas turbine engines contains combustion byproducts. Example combustion byproducts include sulfur dioxide, carbon dioxide, nitrogen oxides, and particulate matter, including volatile and non-volatile particulate matter. The most prevalent substance of non-volatile particulate matter is black carbon (commonly referred to as carbonaceous soot). Black carbon is formed by incomplete combustion of fuel. Other non-volatile particulates may include dust, metal, and ceramic particles. Non-volatile particulate matter may negatively affect human health and the environment.

Accordingly, it has been a common goal to reduce the negative impacts of such combustion byproducts, particularly non-volatile particulate matter. Generally, to study non-volatile particulate matter from aerosol streams, samples are taken from such streams and particulate matter measuring devices are used to measure various parameters of the non-volatile particulate matter, including for example, particulate mass concentration, number concentration, particulate size distribution, etc. Obtaining a sample that is representative of the actual non-volatile particulate matter concentration from such high pressure aerosol streams has presented certain challenges.

One challenge with obtaining a sample representative of the actual non-volatile particulate matter concentration is that exhaust aerosol streams are generated in a high pressure environment, e.g., the combustor assembly of a gas turbine engine. For existing particulate measurement devices to accurately measure the non-volatile particulate matter, the pressure of the aerosol exhaust stream must be reduced to at or near ambient pressure. While conventional pressure reduction systems are capable of reducing the pressure of aerosol streams to ambient pressure, such conventional systems greatly alter or change the concentration of the non-volatile particulate matter when the pressure of the aerosol streams are reduced to ambient pressure. Thus, when a sample from the aerosol stream is measured by a particulate measurement device, the measurements may not be representative of the particulate environment that was present at high pressure.

As conventional pressure reduction systems have been unsuccessful at reducing the pressure of aerosol streams without affecting or minimally affecting the non-volatile particulate matter concentration of such streams, it has been challenging for designers of gas turbine engines to successfully measure and characterize non-volatile particulate matter of such aerosol exhaust streams. Thus, verifying new emission reduction designs, testing engines in service, modeling for "particulate emission reduction," and characterizing transfer functions between the aerosol source (e.g., a combustor) and typical measurement planes required by certification authorities has been particularly challenging.

Accordingly, a pressure reduction system and methods therefore that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a pressure reduction system. The pressure reduction system includes an enclosure defining a first chamber and a second chamber positioned downstream of the first chamber. The pressure reduction system also includes an inlet port fluidly connecting a high pressure environment and the first chamber, the inlet port defining a first expansion orifice through which an aerosol stream comprised of non-volatile particulates is delivered to the first chamber from the high pressure environment, wherein the aerosol stream has a first pressure drop after passing through the first expansion orifice from a high pressure to an intermediate pressure. In addition, the pressure reduction system includes a transition tube fluidly connecting the first chamber and the second chamber, the transition tube defining an inlet and a second expansion orifice through which the aerosol stream is delivered to the second chamber from the first chamber, wherein the aerosol stream has a second pressure drop after passing through the second expansion from the intermediate pressure to a low pressure. Moreover, the pressure reduction system includes a sample outlet port defining a sample outlet of the second chamber, wherein a portion of the aerosol stream having the low pressure is configured to flow through the sample outlet.

In another aspect, the present disclosure is directed to a method for reducing a pressure of an aerosol stream comprised of non-volatile particulates from a high pressure to a low pressure. The method includes expanding the aerosol stream through a first expansion orifice into a first chamber defined by an enclosure to reduce the aerosol stream from the high pressure to an intermediate pressure. The method also includes expanding the aerosol stream through a second expansion orifice defined by a transition tube into a second chamber defined by the enclosure to reduce the aerosol stream from the intermediate pressure to the low pressure, wherein the transition tube is completely contained within the enclosure.

In a further aspect, the present disclosure is directed to a pressure reduction system. The pressure reduction system includes an enclosure formed at least in part of a conducting material and defining a first chamber and a second chamber positioned downstream of the first chamber. Further, the pressure reduction system includes an inlet port fluidly connecting a high pressure environment and the first chamber, the inlet port defining a first expansion orifice through which an aerosol stream comprised of non-volatile particulates is delivered to the first chamber from the high pressure environment, wherein the aerosol stream has a first pressure drop after passing through the first expansion orifice from a high pressure to an intermediate pressure. In addition, the pressure reduction system includes an overflow pressure valve fluidly connected to the first chamber for selectively regulating the pressure of the aerosol stream within the first chamber. The pressure reduction system also includes a transition tube formed of a conducting material and fluidly connecting the first chamber and the second chamber and mounted to the enclosure, the transition tube defining an inlet and a second expansion orifice through which the aerosol stream is delivered to the second chamber from the first chamber, wherein the aerosol stream has a second pressure drop after passing through the second expansion from the intermediate pressure to a low pressure. Further, the pressure reduction system includes a heating assembly for providing heat to the enclosure. The pressure reduction system additionally includes a sample outlet port defining a sample outlet of the second chamber, wherein a portion of the aerosol stream having the low pressure is configured to flow through the sample outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error. Further, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present disclosure is directed to a pressure reduction system and methods therefore for reducing the pressure of a high pressure aerosol, e.g., to ambient pressure, without significantly changing the characteristics of the aerosol. In this way, the non-volatile particulate matter concentration in a sample stream obtained from the aerosol stream at ambient pressure is representative of the non-volatile particulate matter concentration that was present in the aerosol stream at high pressure prior to the pressure reduction. Such representative samples may be used to measure various characteristics of the non-volatile particulates of high pressure aerosols.

In one exemplary aspect, a pressure reduction system is provided. The pressure reduction system includes features that reduce the pressure of a high pressure aerosol to ambient pressure without significantly changing the characteristics of the aerosol. In particular, the pressure reduction system includes two expansion orifices that reduce the pressure of an aerosol stream in two stages. The aerosol is directed from a high pressure environment, e.g., a combustor assembly of a gas turbine engine, through a first expansion orifice defined by an inlet port and into a first chamber defined by an enclosure causing the aerosol stream to expand. As the aerosol expands, the high pressure aerosol is reduced to an intermediate pressure and the temperature is also reduced. A transition tube fluidly connecting the first chamber with a second chamber defined by the enclosure receives a portion of the aerosol stream. As the aerosol flows through the transition tube, the transition tube settles the flow and exchanges heat with the gas aerosol. The heating of the flow facilitates a constant volumetric flow rate (or close to a constant volumetric flow rate) through the system and prevents condensation from forming along the gas path of the system. The aerosol is directed through a second expansion orifice defined by the transition tube at its downstream end and into the second chamber. Thus, the aerosol stream is expanded once more, reducing the pressure of the aerosol stream from the intermediate pressure (the pressure of the aerosol stream upstream of the second expansion orifice and downstream of the first expansion orifice) to a low pressure. The low pressure may be an ambient pressure, for example. A portion of the low pressure aerosol may then be directed to a particulate matter measurement device for measuring the particulates of the aerosol. The pressure reduction of the aerosol without significantly changing the characteristics of the aerosol is achieved via a constant volumetric flow rate of the aerosol through the first and second expansion orifices via isentropic expansion and isobaric heating of the aerosol upstream of the second expansion orifice in the transition tube, and to a smaller extent, upstream of the first expansion orifice at the inlet port. In another exemplary aspect, methods for utilizing the pressure reduction system to reduce the pressure of a high pressure aerosol to ambient pressure without significantly changing the characteristics of the aerosol are also provided.

Figure 1:
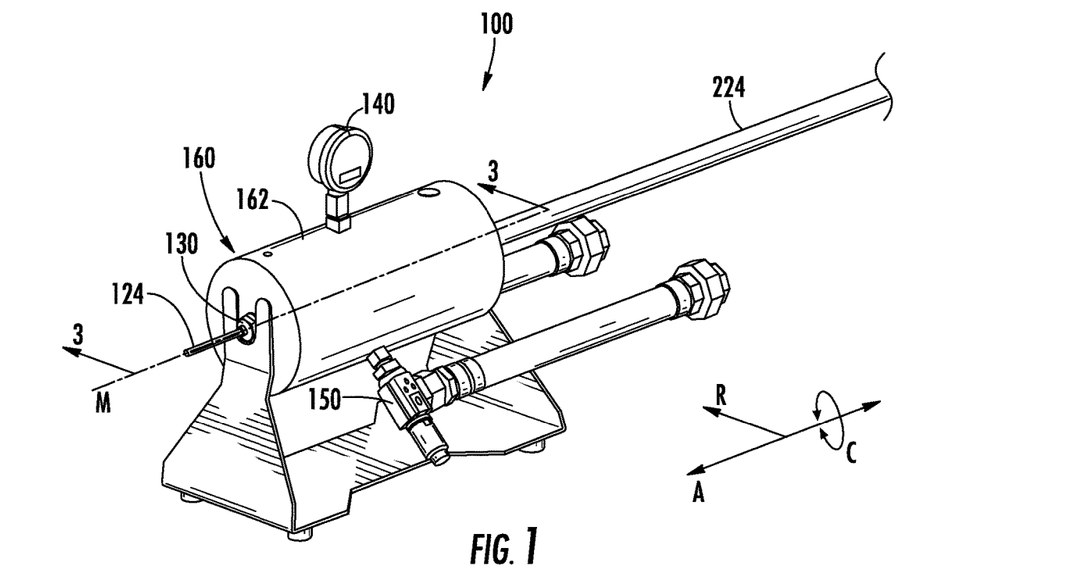
FIG. 1 provides a perspective view of an exemplary pressure reduction system in accordance with exemplary embodiments of the present disclosure.
Figure 2:
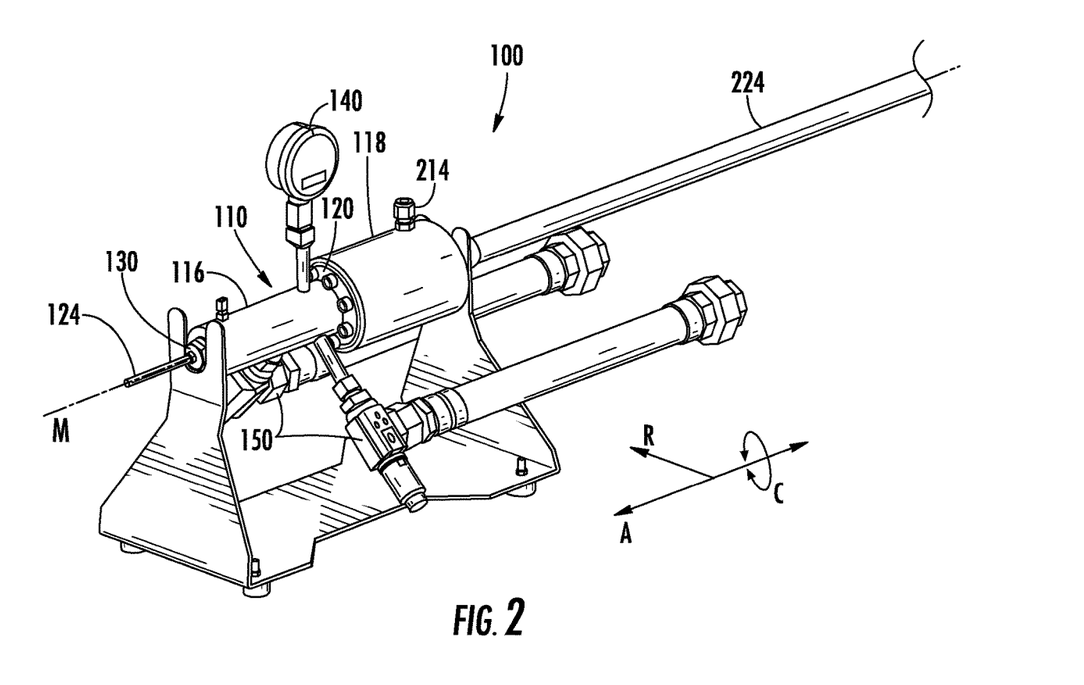
FIG. 2 provides a perspective view of the pressure reduction system of FIG. 1 depicting a heating element removed to reveal an enclosure of the pressure reduction system.
Figure 3:
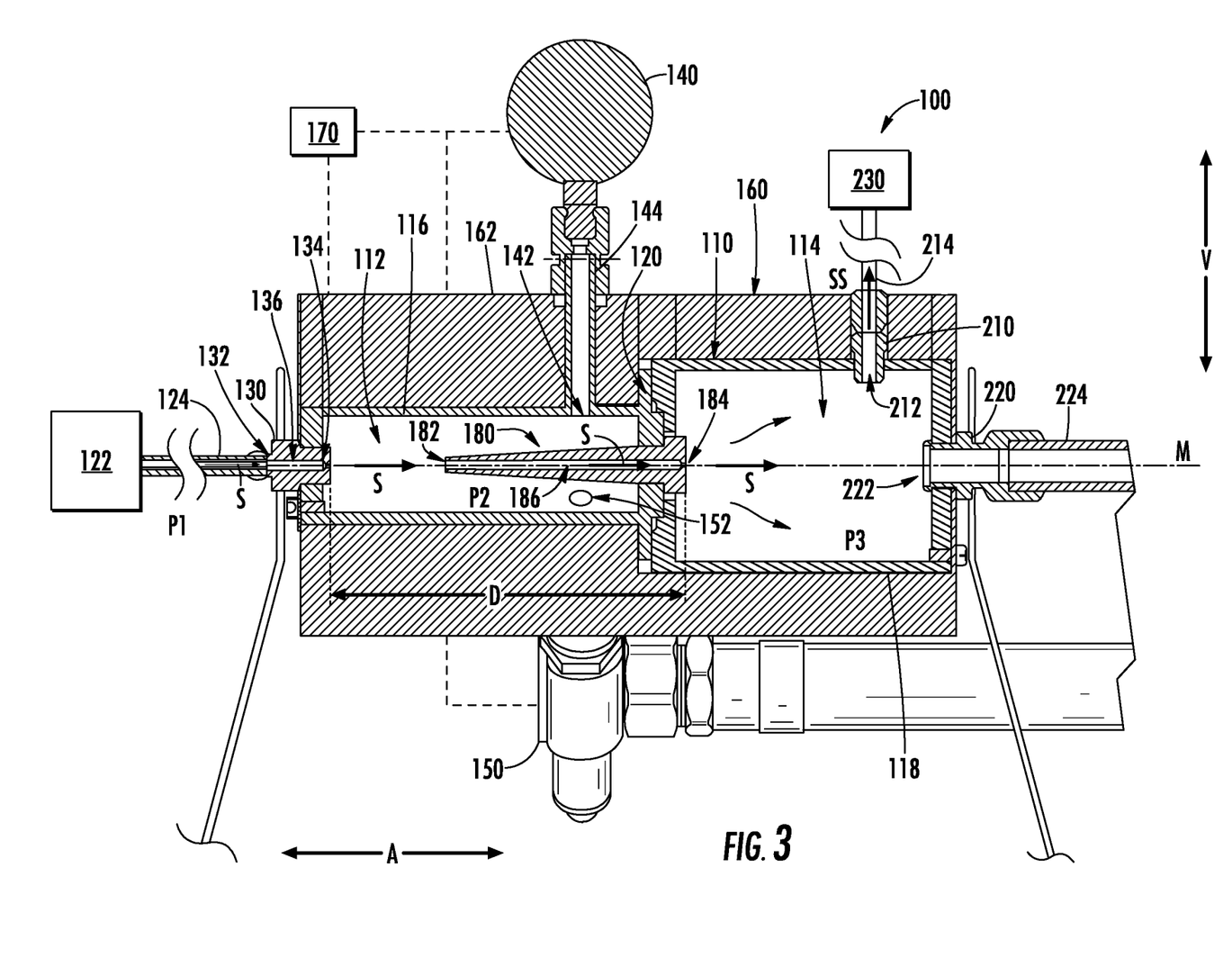
FIG. 3 provides a cross-sectional view of the pressure reduction system taken along line 3-3 of FIG. 1.

FIGS. 1, 2 and 3 provide various views of an exemplary pressure reduction system 100 in accordance with exemplary embodiments of the present disclosure. More particularly, FIG. 1 provides a perspective view of the pressure reduction system 100, FIG. 2 provides another perspective view of the pressure reduction system 100 with a heating assembly removed to reveal an enclosure of the pressure reduction system 100, and FIG. 3 provides a cross-sectional view of the pressure reduction system 100 taken along line 3-3 of FIG. 1. The pressure reduction system 100 defines an axial direction A, a radial direction R, and a circumferential direction C extending about the axial direction A. The axial direction A, the radial direction R, and the circumferential direction C define a direction system. Further, the pressure reduction system 100 also defines a main axis M that extends along the axial direction A.

As shown best in FIGS. 2 and 3, the pressure reduction system 100 includes an enclosure 110 that defines a first chamber 112 and a second chamber 114. The second chamber 114 is positioned downstream of the first chamber 112. For this embodiment, the enclosure 110 includes a first cylinder 116 and a second cylinder 118 that is connected to a flange 120 of the first cylinder 116. The first cylinder 116 defines the first chamber 112 and the second cylinder 118 defines the second chamber 114. In some embodiments, however, the enclosure 110 may be formed as a single, continuous monolithic component. Further, for this embodiment, the enclosure 110 is formed at least in part by a conducting material, such as e.g., a metal material. In preferred embodiments, the enclosure 110 is entirely formed of a conducting material.

As shown particularly in FIG. 3, an inlet port 130 fluidly connects a high pressure environment 122 and the first chamber 112. More particularly, as depicted, an inlet conduit 124 fluidly connects the high pressure environment 122 with the inlet port 130, which in turn fluidly connects the inlet conduit 124 with the first chamber 112. The high pressure environment 122 may be any suitable high pressure environment. For instance, the high pressure environment 122 may be a combustor assembly of a gas turbine engine. The inlet port 130 defines an inlet 132 and a first expansion orifice 134 spaced from the inlet 132, e.g., along the axial direction A. The first expansion orifice 134 serves an outlet of the inlet port 130. The inlet 132 of inlet port 130 is positioned upstream of the first expansion orifice 134 and is fluidly connected with the inlet conduit 124. An inlet port passage 136 defined by the inlet port 130 extends between and fluidly connects the inlet 132 with the first expansion orifice 134. During operation of the pressure reduction system 100, an aerosol stream S comprised of non-volatile particulates flows through the first expansion orifice 134 such that the aerosol stream S is delivered to the first chamber 112 from the high pressure environment 122. The aerosol stream S may be an exhaust stream, for example, such as an exhaust stream from a combustor assembly of a gas turbine engine.

Notably, the pressure of the aerosol stream S upstream of the first expansion orifice 134, denoted as high pressure P1, is higher relative to the pressure within the first chamber 112 and the outlet pressure of the pressure reduction system 100, as will be explained in detail herein. For instance, the high pressure P1 may be three bar (3 bar) up to about seventy bar (70 bar). In some embodiments, the high pressure P1 may be even higher than seventy bar (70 bar). When the aerosol stream S flows through the first expansion orifice 134, the first expansion orifice 134 reduces the pressure of the aerosol stream S from high pressure P1 to an intermediate pressure P2, e.g., via expansion through the first expansion orifice 134. As one example, suppose the high pressure P1 of the aerosol stream S is fifty bar (50 bar). The first expansion orifice 134 may reduce the pressure of the aerosol stream S to an intermediate pressure P2 of seven and one tenth bar (7.10 bar). The intermediate pressure P2 is indicative of the pressure of the aerosol stream within the first chamber 112 as shown in FIG. 3.

Figure 4:
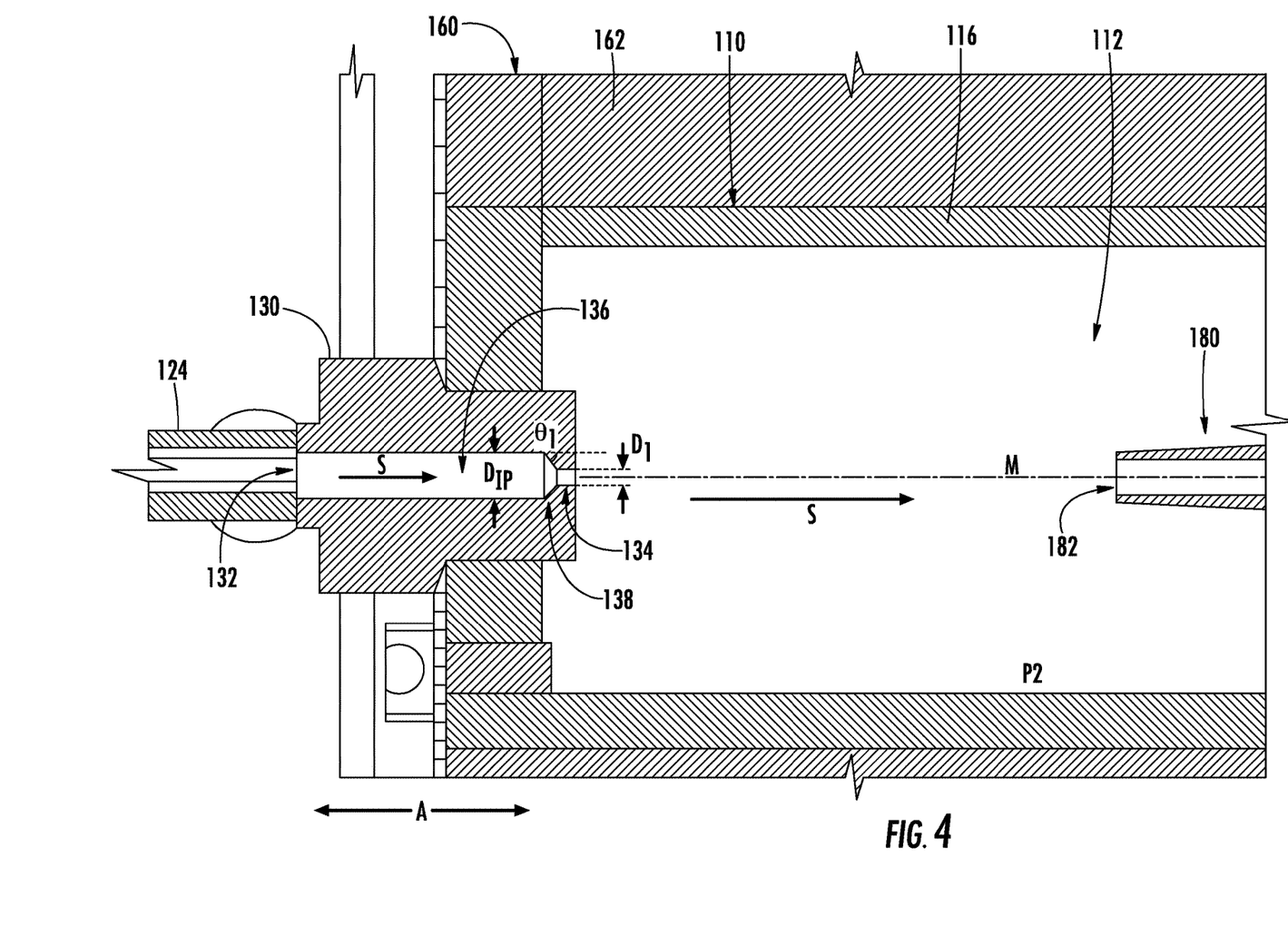
FIG. 4 provides a close up, cross-sectional view of an inlet port of the pressure reduction system as viewed at Section 4 of FIG. 3.

FIG. 4 provides a close up view of the inlet port 130. As shown, the first expansion orifice 134 has a first diameter $D_1$. The inlet port passage 136 has a diameter $D_{IP}$. The inlet 132 of inlet port 130 has the same diameter $D_{IP}$ as the inlet port passage 136. For this embodiment, the diameter $D_{IP}$ is at least three and a half times (3.5) greater than the first diameter $D_1$. As further depicted, a first conical frustum 138 defined by the inlet port 130 transitions the inlet port passage 136 to the first expansion orifice 134. For this embodiment, the first conical frustum 138 transitions the inlet port passage 136 to the first expansion orifice 134 at an angle $\theta_1$ of about sixty degrees (60°) with respect to the axial direction A. Preferably, the angle $\theta_1$ is at least forty-five degrees (45°) with respect to the axial direction A. The first conical frustum 138 funnels the aerosol stream S into the first expansion orifice 134 and prevents stress risers. The first conical frustum 138 and the first expansion orifice 134 form a converging throat of the inlet port 130.

Returning to FIGS. 1 through 3, as shown, the pressure reduction system 100 includes a pressure sensing device 140 fluidly connected to the first chamber 112 for measuring or sensing the pressure of the aerosol stream S in the first chamber 112, which at this stage of the pressure reduction system 100 has intermediate pressure P2. The pressure sensing device 140 may be an analog pressure gauge, for example. As shown particularly in FIG. 3, the enclosure 110 defines an opening 142. An inlet of a conduit 144 is positioned in the opening 142 and extends outward from the first chamber 112 along the radial direction R to fluidly connect the pressure sensing device 140 with the first chamber 112.

The pressure reduction system 100 also includes an overflow pressure valve 150. In particular, for this embodiment, the pressure reduction system 100 includes a pair of overflow pressure valves 150 (FIG. 2). In some embodiments, the pressure reduction system 100 may include more than two (2) valves or only one (1) overflow pressure valve 150. Each of the overflow pressure valves 150 are fluidly connected to the first chamber 112 for selectively regulating the pressure of the aerosol stream S within the pressure reduction system 100, and more particularly within the first chamber 112. Stated differently, each overflow pressure valve 150 is movable between an open position and a closed position, and in the event of excess pressure above a predetermined set pressure in the first chamber 112, one or more of the overflow pressure valves 150 are moved to the open position to remove a portion of the aerosol stream S from the first chamber 112 to reduce the pressure therein. In the event the pressure within the first chamber 112 is at or below the predetermined set pressure, the overflow pressure valves 150 may be moved to the closed position. The overflow pressure valves 150 may be movable between an infinite number of open positions and the closed position, e.g., by use of proportional control valves, or may be switchable between a single open position and a closed position. The first chamber 112 defines a pair of outlets 152 (only one shown in FIGS. 3 and 5) that allows excess portions of the aerosol stream S to exit the first chamber 112 and flow downstream to the overflow pressure valves 150.

In addition, for this embodiment, the pressure reduction system 100 includes a heating assembly 160. The heating assembly 160 is configured to selectively heat the enclosure 110 to a predetermined set temperature.

Advantageously, the enclosure 110 is heated by the heating assembly 160 to prevent or minimize condensation during expansion of the aerosol stream S after flowing through the first expansion orifice 134 and a second expansion orifice as will be explained further below. In some embodiments, the heating assembly 160 is configured to maintain a temperature within plus or minus five degrees Celsius (5° C.) of the predetermined set temperature. In some embodiments, the predetermined set temperature is set between one hundred degrees Celsius (100° C.) and about two hundred fifty degrees Celsius (250° C.). In some preferred embodiments, the predetermined set temperature is set at about one hundred fifty degrees Celsius (150° C.).

The heating assembly 160 can include various components for heating the enclosure 100. For instance, in some embodiments, the heating assembly 160 includes one or more heating elements, e.g., electric resistive heaters, and insulation wrapped about the enclosure 110. Further, the heating assembly 160 may include one or more fans to move the relatively warm air across the surfaces of the enclosure 110.

As shown best in FIGS. 1 and 3, for this embodiment, the heating assembly 160 includes a heating jacket 162 wrapped about the enclosure 110. Preferably, the heating jacket 162 wraps entirely about the enclosure 110 along the circumferential direction C (i.e., around the enclosure 110). Moreover, in some preferred embodiments, the heating jacket 162 is wrapped about the enclosure 110 along the entire axial length of the enclosure 110, e.g., as shown in FIGS. 1 and 3. The heating jacket 162 may be formed of any suitable material having high thermal insulation properties, such as e.g., glass wool. The heating jacket 162 also includes one or more suitable heating elements. For instance, in some embodiments, the heating jacket 162 includes a plurality of electric wires that expel heat when electrical current is passed therethrough. Additionally or alternatively, in some embodiments, the heating jacket may include one or more fluid conduits configured for carrying relatively warm fluid therethrough for heating the enclosure 110.

Further, the pressure reduction system 100 includes one or more controllers 170 or computing device(s) configured for controlling various components of the pressure reduction system 100 as depicted in FIG. 3. For instance, in this exemplary embodiment, the controller 170 is communicatively coupled with the overflow pressure valve(s) 150, the pressure sensing device 140, and the heating jacket 162 of the heating assembly 160. The controller 170 may be communicatively coupled with the pressure sensing device 140, the overflow pressure valve(s) 150, the heating jacket 162, and other components of pressure reduction system 100 in any suitable manner, such as e.g., by a suitable wired or wireless connection. In some embodiments, the pressure reduction system 100 may include a dedicated controller 170 for controlling the heating jacket 162 and a dedicated controller 170 for controlling the overflow pressure valves 150. For instance, the controller 170 can control the overflow pressure valves 150 based at least in part on one or more signals from the pressure sensing device 140, as will be explained more fully below. In some embodiments, however, a single controller 170 may control the various aspects of the pressure reduction system 100.

In some exemplary embodiments, the controller 170 is configured to receive one or more signals indicative of the pressure of the aerosol stream S within the first chamber 112, e.g., from the pressure sensing device 140. The controller is then configured to determine whether the pressure of the aerosol stream S within the first chamber 112 is within a predetermined range of a set pressure. The predetermined range may be static or dynamic. For instance, the predetermined range may be based at least in part on the set pressure, which may be dynamically changed to achieve a particular pressure at the outlet of the pressure reduction system 100. The set pressure may be changed to accommodate fluctuations in the pressure of the aerosol stream S flowing to the pressure reduction system 100 upstream of the inlet port 130. The controller 170 is further configured to control the overflow pressure valve(s) 150 to adjust a valve position of the overflow pressure valve(s) 150 based at least in part on whether the pressure of the aerosol stream S within the first chamber 112 (e.g., the intermediate pressure P2) is within the predetermined range of the set pressure. For instance, if the pressure P2 of the aerosol stream S within the first chamber 112 is greater than the predetermined range of the set pressure, then controller 170 activates or controls one or more of the overflow pressure valves 150 to move to the open position. In this way, excess pressure may be expelled to the ambient surroundings effectively reducing the pressure within the first chamber 112. On the other hand, if the pressure P2 of the aerosol stream S within the first chamber 112 is less than the predetermined range of the set pressure, then controller 170 activates or controls one or more of the overflow pressure valves 150 to move to the closed position thus preventing loss of pressure within the first chamber 112.

As shown best in FIG. 3, the pressure reduction system 100 includes a transition tube 180 that fluidly connects the first chamber 112 and the second chamber 114. Notably, the transition tube 180 is completely contained within the enclosure 110. That is, the transition tube 180 is not exposed to external elements that may negatively affect the temperature of the aerosol stream S flowing therethrough. As shown in the depicted embodiment of FIG. 3, the transition tube 180 extends into the first chamber 112, into the second chamber 114, and is positioned between the chambers 112, 114 but is still contained within the enclosure 110.

The transition tube 180 defines an inlet 182 and a second expansion orifice 184. The second expansion orifice 184 is spaced from the inlet 182 of the transition tube 180, e.g., along the axial direction A. A transition passage 186 defined by the transition tube 180 extends between and fluidly connects the inlet 182 of the transition tube 180 with the second expansion orifice 184 of the transition tube 180. The inlet 182 of transition tube 180 is positioned upstream of the second expansion orifice 184. The second expansion orifice 184 serves as an outlet of the transition tube 180 and an inlet to the second chamber 114. During operation of the pressure reduction system 100, the aerosol stream S comprised of non-volatile particulates flows through the second expansion orifice 184 such that the aerosol stream S is delivered to the second chamber 114 from the first chamber 112.

The pressure of the aerosol stream S upstream of the second expansion orifice 184 and downstream of the first expansion orifice 134 has an intermediate pressure P2, as noted above. When the aerosol stream S flows through the second expansion orifice 184, the second expansion orifice 184 reduces the pressure of the aerosol stream S from the intermediate pressure P2 to a low pressure P3, e.g., via expansion through the second expansion orifice 184. Continuing with the example noted above, suppose the intermediate pressure P2 of the aerosol stream S is seven and one tenth bar (7.10 bar). The second expansion orifice 184 may reduce the pressure of the aerosol stream S to the low pressure P3 of one bar (1 bar). The low pressure P3 is indicative of the pressure of the aerosol stream within the second chamber 114. At one bar (1 bar), particulate measurement devices may measure the concentration of non-volatile particulates in representative samples of the aerosol stream S.

Figure 5:
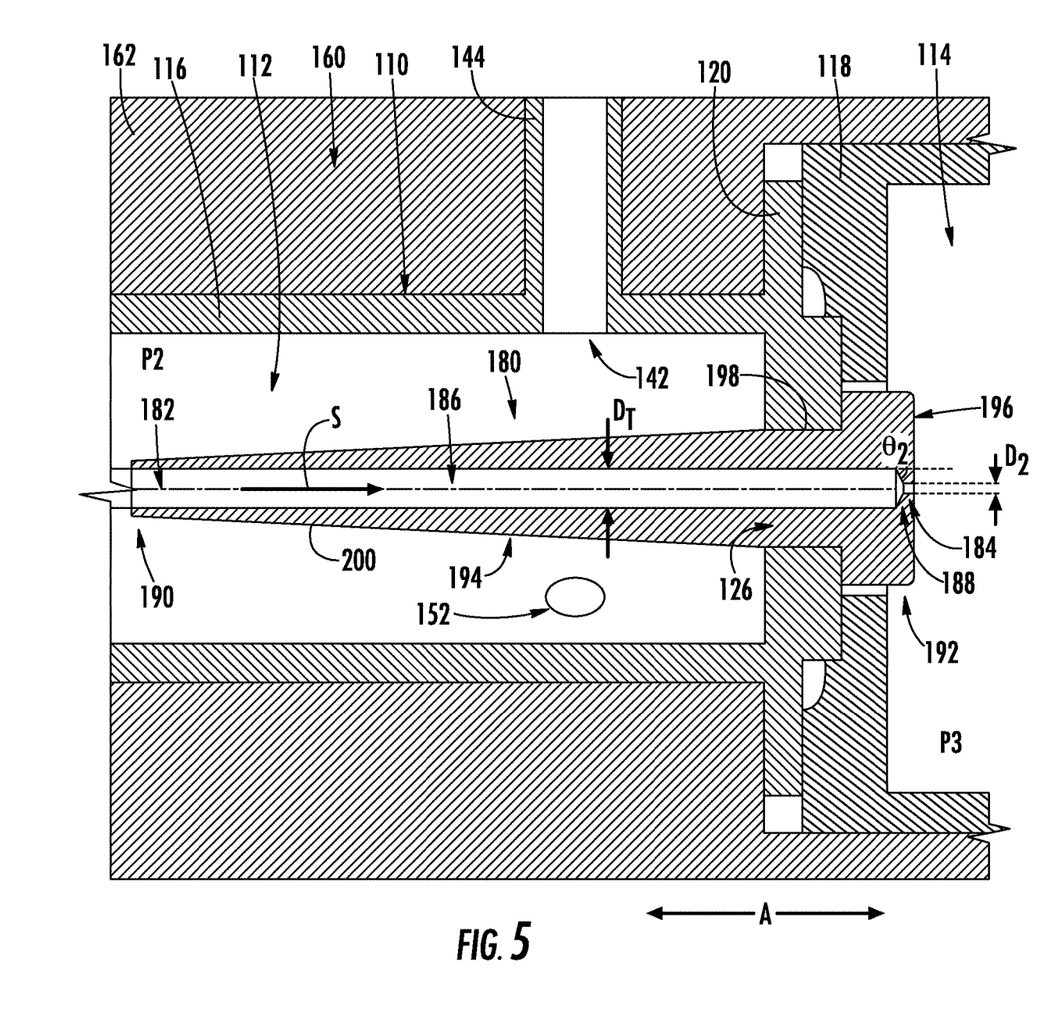
FIG. 5 provides a close up, cross-sectional view of a transition tube of the pressure reduction system as viewed at Section 5 of FIG. 3.

FIG. 5 provides a close up view of the transition tube 180. As shown, the second expansion orifice 184 has a second diameter $D_2$. For this embodiment, the first diameter $D_1$ of the first expansion orifice 134 (FIG. 4) and the second diameter $D_2$ of the second expansion orifice 184 are equal (i.e., they have the same diameter). The transition passage 186 has a diameter $D_T$. The diameter $D_T$ of the transition passage 186 remains the same or constant over substantially the axial length of the transition tube 180. For this embodiment, the diameter $D_T$ of the transition passage 186 is at least three and a half (3.5) times greater than the second diameter $D_2$ of the second expansion orifice 184. As further depicted, a second conical frustum 188 defined by the transition tube 180 transitions the transition passage 186 to the second expansion orifice 184. In addition, for this embodiment, the second conical frustum 188 transitions the transition passage 186 to the second expansion orifice 184 at an angle $\theta_2$ of about sixty degrees (60°) with respect to the axial direction A. Preferably, the angle $\theta_2$ is at least forty-five degrees (45°) with respect to the axial direction A. The second conical frustum 188 funnels the aerosol stream S into the second expansion orifice 184 and prevents stress risers. The second conical frustum 188 and the second expansion orifice 184 form a converging throat of the transition tube 180.

As the aerosol stream S flows through the first expansion orifice 134 and into the first chamber 112 as shown in FIG. 4, the aerosol stream S undergoes expansion through the first expansion orifice 134 and the aerosol stream S expands in volume as it fills into the first chamber 112, and consequently, the pressure and temperature of the aerosol stream S within the first chamber 112 decrease. The aerosol stream S may undergo isentropic expansion through the first expansion orifice 134. Further, as the aerosol stream S expands into the first chamber 112 after exiting the first expansion orifice 134, the aerosol stream S may exhibit turbulent characteristics. To minimize the impact to the quality of the concentration of the aerosol stream S, advantageously, the pressure reduction system 100 includes features that heat the aerosol stream S and settle the flow before the aerosol stream S reaches the second expansion orifice 184. For instance, as shown best in FIG. 3, a distance D is defined between the first expansion orifice 134 and the second expansion orifice 184. Notably, the distance is at least ten (10) times greater than the first diameter $D_1$ and the second diameter $D_2$. The distance D provides a sufficient distance for the aerosol stream S to be heated and settled before entering the second expansion orifice 184. Such heating, which may be isobaric, and settling of the aerosol stream S facilitates a constant volumetric flow rate (or close to a constant volumetric flow rate) through the second expansion orifice 184 of the pressure reduction system 100.

Further, to facilitate stream line capturing of the aerosol stream S exiting the first expansion orifice 134 by the transition tube 180, the inlet 182 of the transition tube 180 is aligned with the first expansion orifice 134 of the inlet port 130 as shown in FIGS. 3 and 4. More particularly, the inlet 182 of the transition tube 180 is concentrically aligned with the first expansion orifice 134 of the inlet port 130. For this embodiment, the inlet 182 of the transition tube 180 is concentrically aligned with the first expansion orifice 134 of the inlet port 130 along the main axis M. By aligning the inlet 182 of the transition tube 180 with the first expansion orifice 134 of the inlet port 130, the particulate concentration of the aerosol stream S is better maintained, particularly during when one of the overflow pressure valves 150 are moved to the open position to reduce the pressure P2 within the first chamber 112.

As further depicted in FIG. 5, the transition tube 180 extends between an upstream end 190 and a downstream end 192, e.g., along the axial direction A, and extends generally along the main axis M. The upstream end 190 of the transition tube 180 is positioned within the first chamber 112 and the downstream end 192 is positioned within the second chamber 114. The transition tube 180 includes a body 194 and a head 196. The body 194 includes a step portion 198 and a conical frustum portion 200. The head 196 of the transition tube 180 is positioned at the downstream end 192 of the transition tube 180 and is seated against the first cylinder 116, and more particularly the flange 120 of the first cylinder 116. The conical frustum portion 200 extends from the upstream end 190 to the step portion 198. The step portion 198 is positioned within a transition opening 126 defined by the enclosure 110 between the first chamber 112 and the second chamber 114. Moreover, for this embodiment, the transition tube 180 is formed of a conducting material, such as e.g., a metal material. In some embodiments, only the body 194 need be formed of a conducting material.

Figure 6:
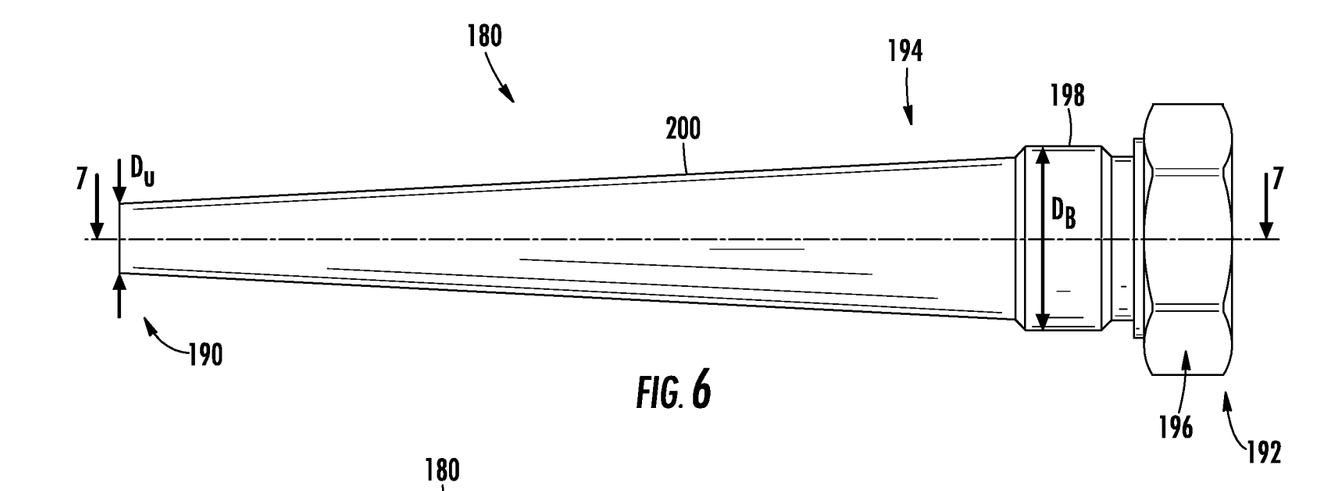
FIG. 6 provides a side view of the transition tube of FIG. 5.
Figure 7:
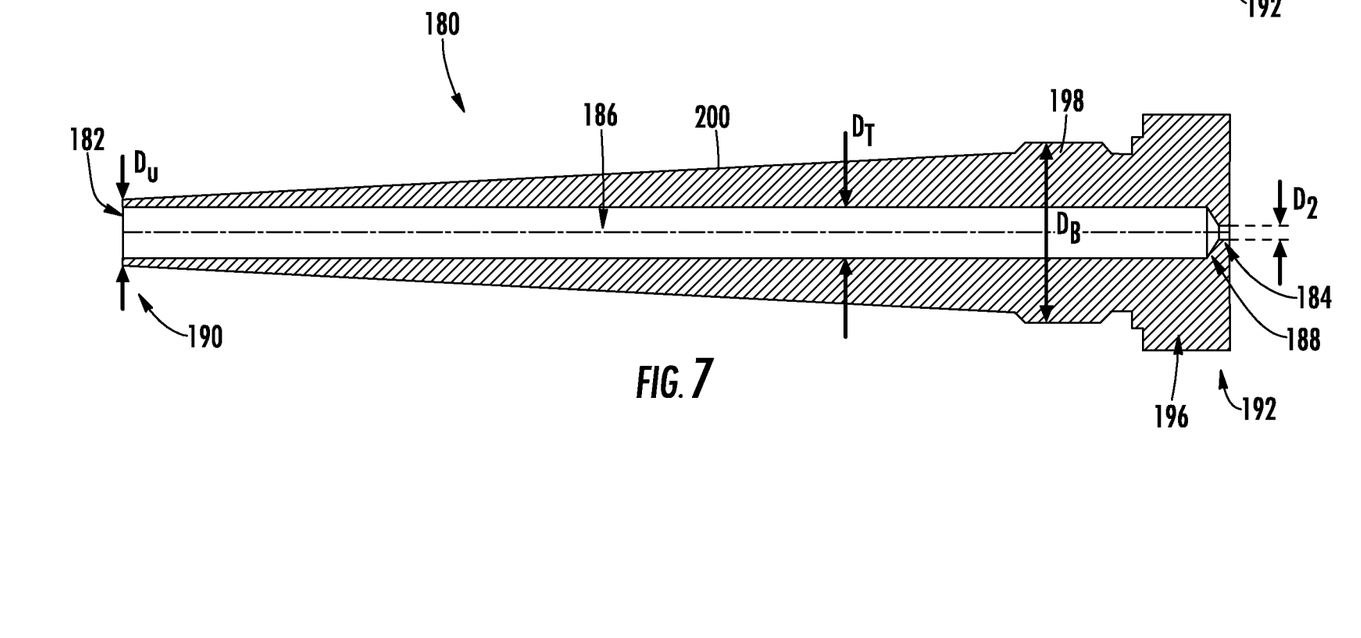
FIG. 7 provides a cross-sectional view of the transition tube taken along line 7-7 of FIG. 6.

Notably, the transition tube 180 tapers along the axial direction A toward the inlet 182 of the transition tube 180. More particularly, the conical frustum portion 200 of the transition tube 180 tapers along the axial direction A from where it connects with the step portion 198 to the upstream end 190 of the transition tube 180. As shown best in FIGS. 6 and 7, the step portion 198 of the body 194 has an outer diameter that is greater than an outer diameter of the transition tube 180 at its upstream end 190. More particularly, the step portion 198 defines a base diameter $D_B$, which is an outer diameter of the transition tube 180 at the step portion 198. The conical frustum portion 200 defines an upstream diameter $D_U$, e.g., at the upstream end 190 of the transition tube 180. The upstream diameter $D_U$ is the outer diameter of the conical frustum portion 200. For this embodiment, the base diameter $D_B$ of the step portion 198 is at least three (3) greater than the upstream diameter $D_U$.

The tapered geometry of the transition tube 180 facilitates heat transfer with the aerosol stream S flowing through the transition tube 180 as shown in FIG. 5. That is, as the aerosol stream S accelerates through the transition tube 180 (hence cooling the aerosol stream S) prior to flowing through the second expansion orifice 184, the geometry of the transition tube 180 is such that the transition tube 180 exchanges heat with the aerosol stream S to counteract the cooling of the aerosol stream S due to its acceleration. More specifically, heat is supplied to the enclosure 110, e.g., via the heating jacket 162. The conducting material of the enclosure 110 facilitates conduction heat exchange from the outer surfaces of the enclosure 110 to the flange 120. The interface between the conducting annular outer surface of the step portion 198 and the conducting flange 120 of the enclosure 110 warms the transition tube 180. The transition tube 180 is warmed such that its thermal profile heats the aerosol stream S as it flows through the transition passage 186 defined by the transition tube 180. Heating the aerosol stream S flowing through the transition passage 186 facilitates expansion of the aerosol through the second expansion orifice 184. The expansion through the second expansion orifice 184 may be isentropic expansion.

As further depicted in FIG. 3, the pressure reduction system 100 includes a sample outlet port 210 defining a sample outlet 212 of the second chamber 114. As shown, the sample outlet port 210 is not aligned with the second expansion orifice 184 along the main axis M. However, in some embodiments, the sample outlet port 210 may be aligned with the second expansion orifice 184 along the main axis M. During operation of the pressure reduction system 100, a portion of the aerosol stream S having low pressure P3, denoted as sample stream SS, flows through the sample outlet 212. A particulate measurement device 230 positioned downstream of the sample outlet 212 is fluidly connected with the second chamber 114, e.g., via a sample conduit 214 and receives the sample stream SS. Upon receipt of the sample stream SS, the particulate measurement device 230 is configured to measure various parameters of the non-volatile particulate matter within the sample stream SS, including for example, particle mass, number, size distribution, etc. Other parameters may also be measured.

In some embodiments, as shown in FIG. 3, the pressure reduction system 100 defines a vertical direction V, e.g., along the radial direction R. In such embodiments, the particulate measurement device 230 is positioned above the pressure reduction system 100 along the vertical direction V. In this way, particulate losses are minimized and water (e.g., from condensation) is prevented from flowing to the particulate measurement device 230, which may provide for more accurate particulate measurements.

The pressure reduction system 100 also includes a main outlet port 220 defining a main outlet 222 of the second chamber 114. During operation of the pressure reduction system 100, the portion of the aerosol stream S within the second chamber 114 that does not flow through the sample outlet 212 exits the pressure reduction system 100 through the main outlet 222 and to the ambient surroundings through a main conduit 224. Thus, the second chamber 114 defines two (2) outlets, the sample outlet 212 and the main outlet 222.

An exemplary manner in which the pressure reduction system 100 reduces the pressure of a high pressure aerosol with a minimized effect on the concentration of non-volatile particulate matter of the aerosol stream for sampling purposes will now be provided. With reference to FIG. 3, the aerosol stream S having high pressure P3 is directed from the high pressure environment 122, e.g., a combustor assembly of a gas turbine engine, to the pressure reduction system 100 via the inlet conduit 124. The high pressure aerosol stream S is comprised of non-volatile particulate matter, such as carbon black (soot), dust, metal, and ceramic particles. The aerosol stream S enters the pressure reduction system 100 through the inlet port 130 and undergoes a first pressure drop after passing through the first expansion orifice 134 from a high pressure to an intermediate pressure. Particularly, as the aerosol stream S flows through the first expansion orifice 134 defined by the downstream end of the inlet port 130, the aerosol stream S is expanded by the first expansion orifice 134 into the first chamber 112. That is, the aerosol stream S is compressed and accelerated by the first expansion orifice 134, causing the aerosol stream S to rapidly expand as the aerosol stream S enters the first chamber 112. The expansion of the gas aerosol stream S through the first expansion orifice 134 and into the first chamber 112 may be adiabatic in that the high velocity and short residence time of the aerosol stream S through the first expansion orifice 134 prevents an exchange of heat, e.g., with the inlet port 130. Further, the expansion may also be isentropic or nearly isentropic. After expansion through the first expansion orifice 134 and into the first chamber 112, the pressure of the aerosol stream S is reduced from high pressure P1 to the intermediate pressure P2. Thus, the pressure of the aerosol stream S downstream of the first expansion orifice 134 and upstream of the second expansion orifice 184 is the intermediate pressure P2. The temperature of the aerosol stream S is also reduced due to the first pressure drop. As noted previously, the intermediate pressure P2 may be controlled to a set pressure, e.g., by releasing pressure through one or more overflow pressure valves 150.

After entering the first chamber 112 after expansion through the first expansion orifice 134, a portion of the aerosol stream S enters the inlet 182 of the transition tube 180. The aerosol stream S flows downstream through the transition passage 186, and as this occurs, the transition tube 180 settles the flow and warms the aerosol stream S within the transition passage 186. The heating jacket 162 of the heating assembly 160 exchanges heat with the enclosure 110, which in turn exchanges heat with the transition tube 180. The warmed transition tube 180 in turn warms the aerosol stream S. Warming the aerosol stream S prevents condensation from forming in the transition passage 186 or the second expansion orifice 184, which may negatively affect the concentration of the non-volatile particulates and/or disrupt the volumetric flow of the aerosol stream S through the second expansion orifice 184.

At the downstream end of the transition tube 180, the warmed aerosol stream S having an intermediate pressure P2 undergoes a second pressure drop. Particularly, the aerosol stream S is expanded through the second expansion orifice 184 and into the second chamber 114. That is, the aerosol stream S is compressed and accelerated by the second expansion orifice 184, causing the aerosol stream S to rapidly expand as the aerosol stream S enters the second chamber 114. The expansion of the aerosol stream S reduces the pressure from the intermediate pressure P2 to low pressure P3, which may be an ambient pressure, for example. The aerosol stream S having a low pressure P3 is then directed through the sample outlet 212 to the particulate matter measurement device 230 for measuring the particulates of sample stream SS of the aerosol stream S. The excess flow in the second chamber 114 flows through the main outlet 222.

The pressure reduction of the aerosol stream S without significantly changing the characteristics of the aerosol is achieved at least in part via a constant or near constant volumetric flow rate through the first and second expansion orifices 134, 184, expansion through the first expansion orifice 134 and into the first chamber 112, settling and heating in the transition tube 180, and expansion of the aerosol stream S through the second expansion orifice 184 of the transition tube 180 and into the second chamber 114.

Figure 8:
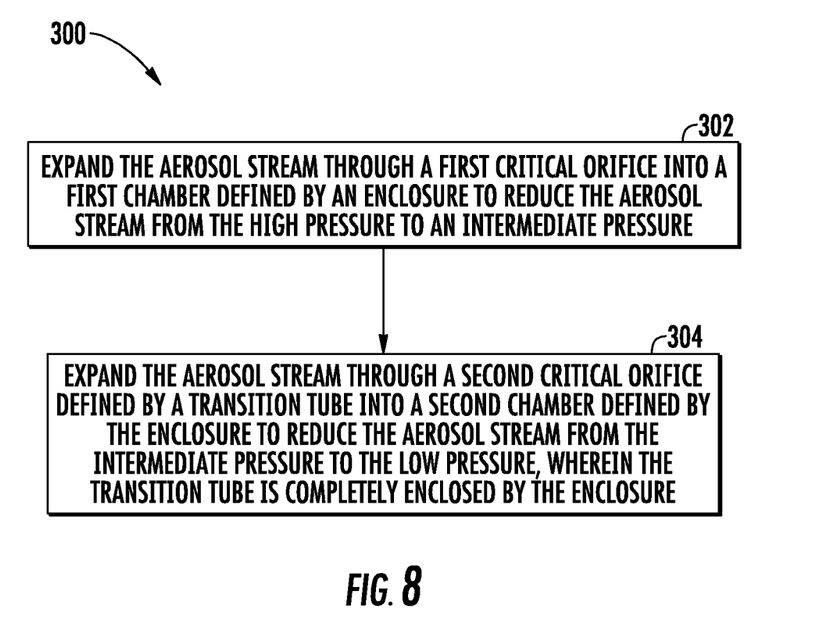
FIG. 8 provides a flow diagram of an exemplary method for reducing a pressure of an aerosol stream comprised of non-volatile particulates from a high pressure to a low pressure in accordance with exemplary aspects of the present disclosure.

FIG. 8 provides a flow diagram of an exemplary method (300) for reducing the pressure of an aerosol stream comprised of non-volatile particulates from a high pressure to a low pressure without affecting or minimally affecting the non-volatile particulate matter concentration of the aerosol stream. For instance, the pressure reduction system 100 described herein may be utilized to reduce the pressure of the high pressure aerosol stream. The aerosol stream may be an exhaust stream of a gas turbine engine, for example. For context, reference numerals utilized to describe the pressure reduction system 100 and its various features will be utilized below.

At (302), the method (300) includes expanding the aerosol stream through a first expansion orifice into a first chamber defined by an enclosure to reduce the aerosol stream from the high pressure to an intermediate pressure. For instance, a high pressure aerosol stream such as an exhaust stream from a combustor assembly, may be directed through the first expansion orifice 134 of inlet port 130 of the pressure reduction system 100. Upstream of the first expansion orifice 134, the pressure of the aerosol stream has a high pressure P1. For instance, the high pressure may be a pressure level between about three bar (3 bar) up to about seventy bar (70 bar). When the high pressure aerosol stream is directed through the first expansion orifice 134, the aerosol stream expands and flows into the first chamber 112 defined by the enclosure 110. The expansion of the aerosol stream reduces the pressure of the aerosol stream from high pressure P1 to intermediate pressure P2. The intermediate pressure P2 is a pressure that is between the high pressure P1 and the low pressure P3.

At (304), the method (300) includes expanding the aerosol stream through a second expansion orifice defined by a transition tube into a second chamber defined by the enclosure to reduce the aerosol stream from the intermediate pressure to the low pressure, wherein the transition tube is completely contained within the enclosure. For instance, the aerosol stream S within the first chamber 112 having an intermediate pressure P2 after expansion through the first expansion orifice 134 at (302), may be directed through the second expansion orifice 184 defined by the transition tube 180 of the pressure reduction system 100. When the aerosol stream S having an intermediate pressure P2 is directed through the second expansion orifice 184, the aerosol stream S expands into the second chamber 114 defined by the enclosure 110. The expansion of the aerosol stream S through the second expansion orifice 184 and into the second chamber 114 reduces the pressure of the aerosol stream S from intermediate pressure P2 to low pressure P3. The low pressure P3 may be an ambient pressure, e.g., one atmosphere (1 atm).

In some implementations, the method (300) includes obtaining a sample stream of the aerosol stream at the low pressure from the second chamber. In this way, a sample stream SS having a representative concentration of the non-volatile particulates in the aerosol stream at the high pressure may be measured by one or more particulate measurement devices 230. For instance, a portion of the aerosol stream S may flow through the sample outlet 212 of the second chamber 114 and downstream to particulate measurement devices 230. As the high pressure aerosol was reduced in pressure to low pressure P3 with minimal effect on the quality and properties of the non-volatile particulates of the aerosol stream, the sample stream SS includes a representative concentration of the non-volatile particulates found in the high pressure aerosol stream, and thus, the one or more particulate measurement devices 230 may accurately measure various parameters of the non-volatile particulates.

Further, in some implementations, the method (300) includes heating the enclosure. When the enclosure is heated, the enclosure exchanges heat with the transition tube, which in turn exchanges heat with the aerosol stream flowing through a transition passage defined by the transition tube upstream of the second expansion orifice. In some implementations, the method (300) includes heating the enclosure with a heating jacket, or more broadly, the method (300) includes heating the enclosure with a heating assembly.

For instance, the enclosure may be heated with the heating assembly 160 of FIG. 1. More particularly, the enclosure 110 may be heated with the heating jacket 162 wrapped about the enclosure 110 as shown in FIG. 1. The heating jacket 162 may be controlled by one or more controllers 170 to maintain a particular temperature or to increase or decrease the temperature of the heating jacket 162 as needed. As noted above, when the heating jacket 162 heats the enclosure 110, which is preferably formed of a conducting material, the enclosure 110 exchanges heat with the transition tube 180 which in turn exchanges heat with the aerosol stream flowing through the transition passage 186 of the transition tube 180. Thus, the aerosol stream is warmed upstream of the second expansion orifice 184. Heating the enclosure 110 with the heating assembly 160 prevents condensation from blocking the expansion orifices 134, 184, and particularly, condensation is prevented from forming in the transition passage 186 upstream of the second expansion orifice 184. Further, heating the aerosol stream within the transition passage 186 helps maintain a more consistent volumetric flow rate through transition passage 186.

In some implementations, the first expansion orifice is aligned with an inlet defined by the transition tube. By aligning the inlet 182 of the transition tube 180 with the first expansion orifice 134 of the inlet port 130, as noted previously, the particulate concentration of the aerosol stream S may be better maintained.

In addition, in some implementations, the pressure reduction system 100 includes overflow pressure valve 150 fluidly connected with the first chamber 112. The pressure reduction system 100 also includes pressure sensing device 140 configured to sense the pressure of the aerosol stream within the first chamber 112. In such implementations, the method (300) includes receiving, by a controller, one or more signals indicative of the pressure of the aerosol stream within the first chamber from the pressure sensing device. The controller may be one or more controllers 170. The method (300) also includes determining whether the pressure of the aerosol stream within the first chamber is within a predetermined range of a set pressure. The method (300) also includes adjusting a valve position of the overflow pressure valve based at least in part on whether the pressure of the aerosol stream within the first chamber is within the predetermined range of the set pressure.

In some implementations, the set pressure within the first chamber is set based at least in part on the equation:

$$P_{SET} = \sqrt{P_1 * P_3} \qquad \text{(Equation 1)}$$

where, $P_{SET}$ is the set pressure within the first chamber 112, $P_1$ is the pressure of the aerosol stream upstream of the first expansion orifice 134, and $P_3$ is the pressure of the aerosol stream downstream of the second expansion orifice 184. For instance, the controller 170 of the pressure reduction system 100 may control the valve position of the one or more overflow pressure valves 150 to open or close to achieve a desired pressure $P_3$ in the second chamber 114. By setting the set temperature in accordance with Equation 1, the temperature drop due to the expansion of the aerosol stream through the first expansion orifice 134 into the first chamber 112 and the expansion of the aerosol stream through the second expansion orifice 184 into the second chamber 114 is minimized, which in turn facilitates a more consistent volumetric flow rate of the aerosol stream as it flows through the pressure reduction system 100.

In some implementations, the set pressure is dynamically set based at least in part on the pressure of the aerosol stream upstream of the first expansion orifice. That is, the set pressure within the first chamber 112 may be dynamically changed based at least in part on the pressure reading of the incoming high pressure aerosol stream. Advantageously, by dynamically setting the set pressure of the pressure of the aerosol stream within the first chamber 112 and removing excess pressure therefrom, e.g., via opening of overflow pressure valve 150, an ambient pressure of the aerosol stream within the second chamber 114 may be consistently achieved, even if the pressure of the incoming aerosol stream is fluctuating. This may be particularly advantageous in obtaining sample streams from exhaust aerosol streams from a combustor assembly of a gas turbine engine in transient operation. Thus, particulate matter emissions may be studied for transient operations of gas turbine engines mounted to aircraft. For instance, samples may be obtained that model the emissions emitted from gas turbine engines during takeoffs, evasive maneuvers, step climbs, or other power changing maneuvers.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing a pressure of an aerosol stream comprised of non-volatile particulates from a high pressure to a low pressure, the method comprising:

expanding the aerosol stream through a first expansion orifice into a first chamber defined by an enclosure to reduce the aerosol stream from the high pressure to an intermediate pressure, wherein an overflow pressure valve is fluidly connected with the first chamber and a pressure sensing device is configured to sense the pressure of the aerosol stream within the first chamber;

receiving, by a controller, one or more signals indicative of the pressure of the aerosol stream within the first chamber from the pressure sensing device;

determining whether the pressure of the aerosol stream within the first chamber is within a predetermined range of a set pressure;

adjusting a valve position of the overflow pressure valve based at least in part on whether the pressure of the aerosol stream within the first chamber is within the predetermined range of the set pressure; and expanding the aerosol stream through a second expansion orifice defined by a transition tube into a second chamber defined by the enclosure to reduce the aerosol stream from the intermediate pressure to the low pressure, wherein the transition tube is completely contained within the enclosure.

2. The method of claim 1, further comprising:

obtaining a sample stream of the aerosol stream at the low pressure from the second chamber, wherein the sample stream comprises a representative concentration of the non-volatile particulates in the aerosol stream at the high pressure.

3. The method of claim 1, further comprising:

heating the enclosure, wherein when the enclosure is heated, the enclosure exchanges heat with the transition tube, which in turn exchanges heat with the aerosol stream flowing through a transition passage defined by the transition tube upstream of the second expansion orifice.

4. The method of claim 1, wherein the set pressure within the first chamber is set based at least in part on the equation: $P_{SET}=\sqrt{P_1 * P_3}$, where $P_{SET}$ is the set pressure within the first chamber, $P_1$ is the pressure of the aerosol stream upstream of the first expansion orifice, and $P_3$ is the pressure of the aerosol stream downstream of the second expansion orifice.

5. The method of claim 4, wherein the set pressure is dynamically set based at least in part on the pressure of the aerosol stream upstream of the first expansion orifice.

* * * * *